United States Patent
Chao

(10) Patent No.: US 9,176,595 B2
(45) Date of Patent: Nov. 3, 2015

(54) SPEED ADJUSTABLE USB KEYBOARD

(71) Applicant: Duckychannel International Co.,Ltd., Taipei (TW)

(72) Inventor: Shih-Chuan Chao, Taipei (TW)

(73) Assignee: Duckychannel International Co., Ltd., Taipei (TW)

( * ) Notice: Subject to any disclaimer, the term of this patent is extended or adjusted under 35 U.S.C. 154(b) by 389 days.

(21) Appl. No.: 13/794,165

(22) Filed: Mar. 11, 2013

(65) Prior Publication Data

US 2014/0139437 A1    May 22, 2014

(30) Foreign Application Priority Data

Nov. 22, 2012 (TW) .............................. 101222606 A

(51) Int. Cl.
*G06F 3/02* (2006.01)
*G06F 3/023* (2006.01)

(52) U.S. Cl.
CPC ...................................... *G06F 3/023* (2013.01)

(58) Field of Classification Search
CPC ..... G06F 3/023; G06F 3/0202; G06F 3/0205; H03M 11/20; H03K 17/9643
See application file for complete search history.

(56) References Cited

U.S. PATENT DOCUMENTS

| 2005/0057521 A1* | 3/2005 | Aull et al. ..................... 345/172 |
| 2012/0266741 A1* | 10/2012 | Bencar et al. .................. 84/645 |

* cited by examiner

*Primary Examiner* — Abbas Abdulselam

(57) ABSTRACT

A speed adjustable USB keyboard is provided. The keyboard comprises a plurality of keys, wherein each of the keys generates a press signal when being pressed and a release signal when being released; and a control module, coupled between the keys and a computer, for simulating a part of the press signal as the release signal to respond to polling signals from the computer according to the setting of at least one of a repeat delay and a repeat rate of the keys.

7 Claims, 4 Drawing Sheets

SPEED ADJUSTABLE USB KEYBOARD

CROSS REFERENCE TO RELATED APPLICATIONS

This Non-provisional application claims priority under 35 U.S.C. §119(a) on Patent Application No(s).101,222,606, filed in Taiwan, Republic of China on Nov. 22, 2012, the entire contents of which are hereby incorporated by reference.

BACKGROUND OF THE INVENTION

1. Field of the Invention

The present invention relates to keyboards, wherein users can directly adjust the character output parameters therefrom.

2. Description of the Related Art

Keyboards are usually designed so that when a user continually presses a key, the keyboard firstly outputs the character of the key once, then pauses for a while, and then repeatedly outputs the same character for several times until the user releases the key. The pause period is the so-called "repeat delay", and the speed for repeatedly outputting the character is the so-called "repeat rate".

The values of the repeat delay and repeat rate vary from keyboard to keyboard. When using a keyboard for word processing, it is easy for users to output extra characters if the repeat delay is too short. In short, a short repeat delay causes trouble when typing. When using a keyboard for playing computer games, it is easy for users to lose games if the repeat delay is too long or if the repeat rate is too slow. In short, a long repeat delay or a slow repeat rate limits operational agility. Therefore, the repeat delay and the repeat rate should be adjustable for an idea keyboard.

In the prior art, users can only change the repeat delay and the repeat rate for a keyboard through the operating system (OS). For the Windows OS, the user must first open the "Control Panel" and click the option "Keyboard" before modifying the repeat delay and the repeat rate (the repeat delay is usually modified to be between 250 ms and 1 s; and the repeat rate is usually modified to be between 2 characters per second and 30 characters per second). This manner is applicable for PS/2 keyboards and USB keyboards.

However, it is much more convenient to change the setting directly via the keyboard rather than via the OS. Meanwhile, a USB keyboard is different from a PS/2 keyboard, and the repeat delay and repeat rate for both depend upon the polling rate of the processor of the computer and can only be adjusted through the OS. Settings can be changed directly via PS/2 keyboards, but not USB keyboards at this time. A USB keyboard allowing for settings to be changed therethrough is desired.

BRIEF SUMMARY OF THE INVENTION

The present invention provides a speed adjustable USB keyboard. The keyboard comprises a plurality of keys, wherein each of the keys generates a press signal when being pressed and a release signal when being released; and a control module, coupled between the keys and a computer, for simulating a part of the press signal as the release signal to respond to polling signals from the computer according to the setting of at least one of a repeat delay and a repeat rate of the keys.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
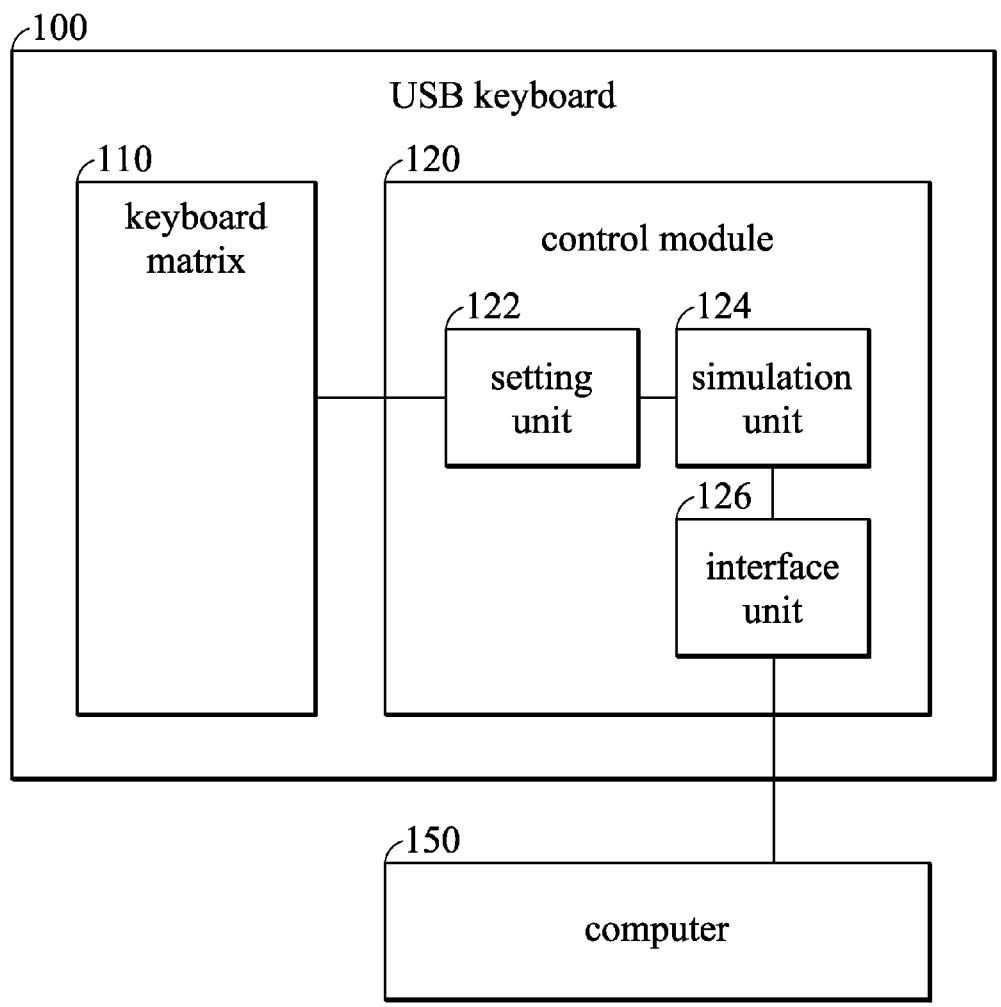
FIG. 1 is schematic diagram of a USB keyboard according to an embodiment of the present invention.
Figure 2:
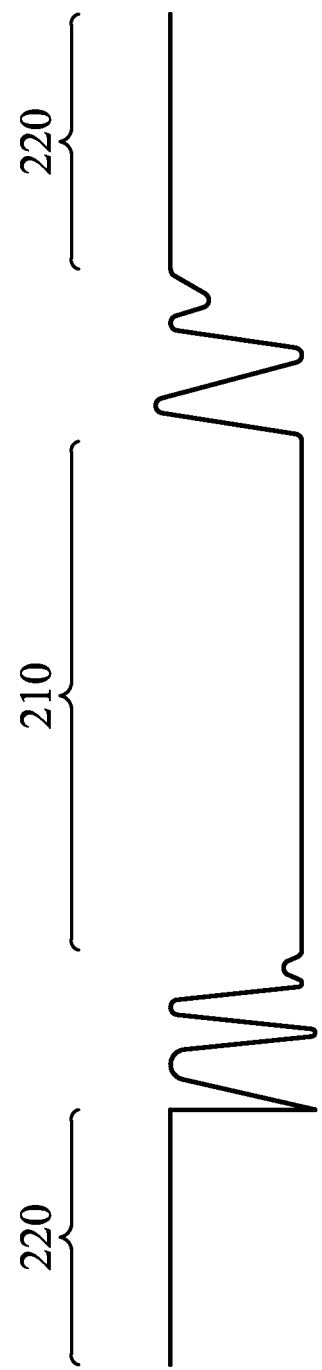
FIG. 2 illustrates the press signal 210 and the release signal 220.

FIG. 1 is schematic diagram of a USB keyboard according to an embodiment of the present invention. The USB keyboard 100 of the present invention comprises a keyboard matrix 110 and a control module 120, wherein the control module 120 is coupled between the keyboard matrix 110 and a computer 150. The keyboard matrix 110 is composed of a plurality of keys, wherein each key can generate two different key states for when it is being pressed or released. The two key states are "the press signal" 210 and "the release signal" 220, which are shown in FIG. 2. FIG. 2 illustrates the press signal 210 and the release signal 220, where the low state represents the press signal 210, and the high state represents the release signal 220. The high and low states are merely for illustration, of the present invention should not be limited thereto. The pulses between the press signal 210 and the release signal 220 are caused due to the contact bounce effect of the key. Since the contact bounce effect is not the subject of the present invention, it will not be described hereafter.

Figure 3A:
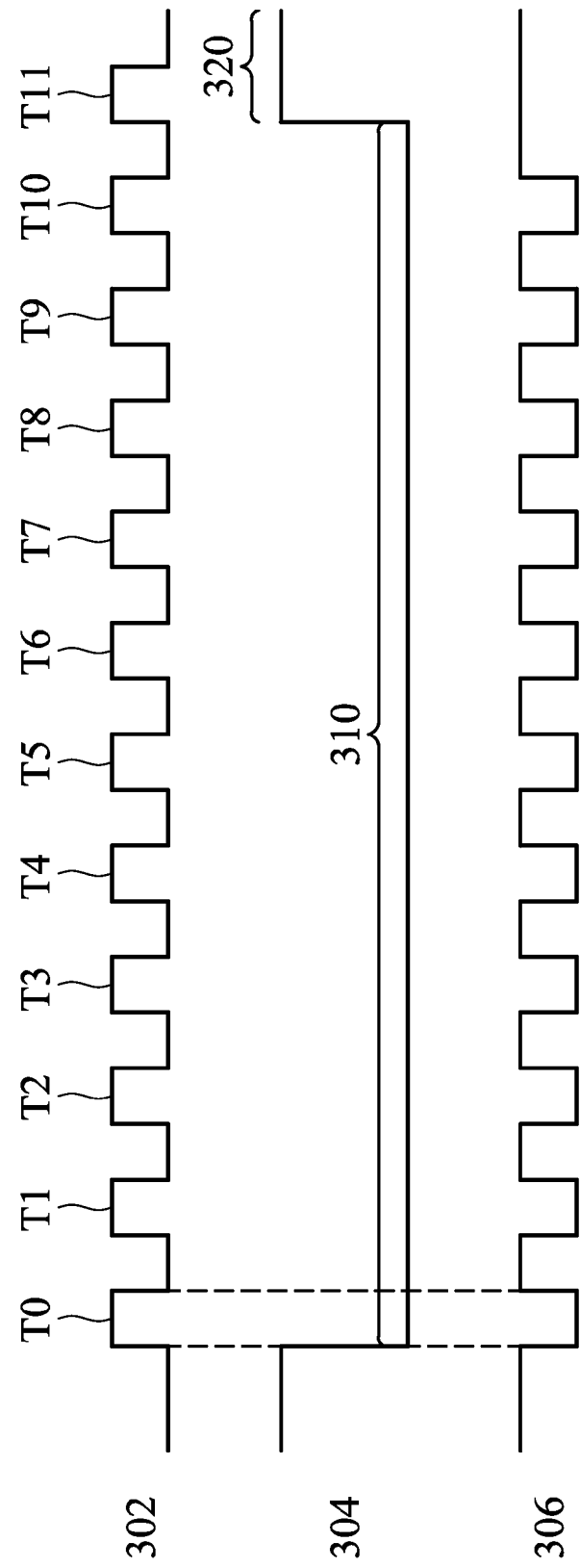
FIG. 3A is a timing diagram of the key states, the polling signal and the character output signal in the prior art.

FIG. 3A is a timing diagram of the key states, the polling signal and the character output signal in the prior art. Similar to that in FIG. 2, the key state 304 in FIG. 3A is the combination of the press signal 310 and the release signal 320, and represents the user continually pressing the key during the time T0~T10, and releasing the key at the time T11. In the prior art, the computer 150 continually sends the polling signals 302 to the keyboard 100. When the computer 150 sends a polling signal (a pulse as shown in FIG. 3A) to the keyboard 100, the computer 150 queries the key state 304 of the keyboard matrix 110. Generally, the speed (or frequency) of the polling signal depends on the processor of the computer. In the following embodiments, the polling rate is 1000 Hz. In other words, the computer 150 queries the key state 304 every 1 ms (i.e., there is 1 ms interval between time T0 and T1).

Note that the polling rate is different from the repeat rate (the character output rate). Given that the repeat delay is zero and the repeat rate is at its maximum in the embodiments of FIG. 3, the computer 150 then: (1) determines that the key has been pressed and outputs the character of the key (low state in signal 306) when detecting the press signal 310 (low state in signal 304); or (2) determines that the key has been released and does not output the character of the key (high state in signal 306) when detecting the release signal 320 (high state in signal 304). Since the key is continually pressed during T0~T10, the repeat rate is substantially equal to the polling rate, i.e., 1000 characters per second. In some embodiments, the user can set the repeat rate to be a multiple of the polling rate through the OS. However, in the prior art, one cannot directly set the repeat delay and the repeat rate through the keyboard end.

Figure 3B:
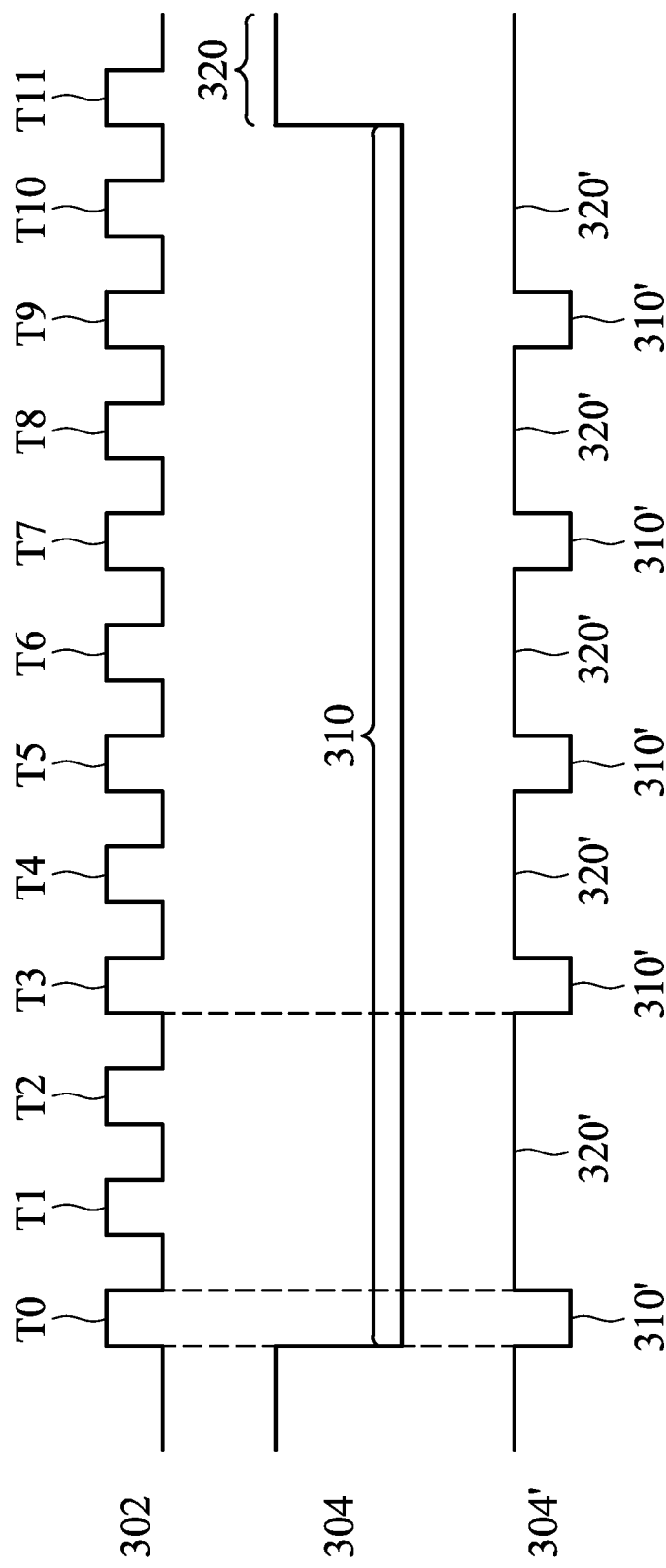
FIG. 3B is a timing diagram of the key states, the polling signal and the character output signal of the present invention.

FIG. 3B is a timing diagram of the key states, the polling signal and the character output signal of the present invention. FIG. 3B and FIG. 3A have the same polling signal 302 and key state 304.

The control module 120 of the present invention can simulate pressing and releasing by users, and thus make the repeat delay and the repeat rate of the USB keyboard 100 adjustable. Specifically, the control module 120 simulates part of "the press signal 304" as "the release signal" (i.e., changes part of "the press signal 304" to be "the release signal") according to the setting values of the repeat delay and the repeat rate to respond the polling signal 302 from the computer.

The control module 120 of the present invention comprises a setting unit 122, a simulation unit 124 and an interface unit 126.

The interface unit 122 of the present invention is used to receive the polling signal 302 from the computer 150, and output the simulated key states 304' to the computer 150. The simulated key state 304' comprises the simulated press signal 310' and the simulated release signal 320'.

The setting unit 122 of the present invention can receive the setting values of the repeat delay and/or the repeat rate for the keyboard 100 from the user via the keys. In an embodiment, the keyboard 100 of the present invention has at least one dedicated key so that the user can press the dedicated key to activate the setting procedure. In another embodiment, the keyboard 100 of the present invention may not have any dedicated key, but a user can press the key combination (a group of keys) to activate the setting procedure. Note that the present invention is applicable to one or more than one key. For example, in order to conduct word processing and gaming, the user can divide the keyboard of the present invention into two areas: an area for word processing and an area for gaming, and set them with different repeat delays and repeat rates.

The simulation unit 124 of the present invention is used to simulate the repeat delay and the repeat rate for the output characters according to the setting value received by the setting unit.

In an example, when the repeat delay is set to be 3 ms, the simulation unit 124 can change the repeat delay by converting the part of the press signal (low state) which is after time T0 and before time T3 into a release signal (high sate). As such, the simulation unit 124 makes the computer 150 believe that the key has been released during the time T0 to T3, thus simulating a new repeat delay.

In an example, when the repeat delay is set to be 3 ms and the repeat rate is set to be twice of the polling rate (i.e., 500 characters per second), the simulation unit 12 can change the repeat rate by converting the part of the press signal at the times T4, T6, T8 and T10 (low state) into release signals (high state). As such, the simulation unit 124 makes the computer 150 believe that the key has been pressed and released alternatively with a frequency of 500/s, thus simulating a new repeat rate. Note that the repeat delay of 3 ms and the repeat rate of 500/s in FIG. 3B are merely for illustration, of the present invention should not be limited thereto.

With the simulation of the control module 120, the repeat delay and the repeat rate of the USB keyboard 100 can be easily adjusted from the keyboard end and independent of the setting of the OS.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A speed adjustable USB keyboard, comprising:
   a plurality of keys, wherein each of the keys generates a press signal when being pressed and a release signal when being released; and
   a control module, coupled between the keys and a computer, for simulating a part of the press signal as the release signal to respond to polling signals from the computer according to the setting of at least one of a repeat delay and a repeat rate of the keys.

2. The speed adjustable USB keyboard as claimed in claim 1, the control module further receiving a setting value of the repeat delay and/or the repeat rate from a user via the keys.

3. The speed adjustable USB keyboard as claimed in claim 2, wherein the setting value of the repeat delay and/or the repeat rate is revised via at least one dedicated key from the keys.

4. The speed adjustable USB keyboard as claimed in claim 2, wherein the setting value of the repeat delay and/or the repeat rate is revised via a combination of keys.

5. The speed adjustable USB keyboard as claimed in claim 1, the control module further converting the part of the press signal into the release signal according to the setting value of the repeat delay, wherein the part of the press signal is in the period of the repeat delay and corresponds to the polling signals other than the first polling signal.

6. The speed adjustable USB keyboard as claimed in claim 1, the control module further converting, according to the setting value of the repeat delay and the repeat rate, the part of the press signal after the repeat delay into the release signal to make the output rate of the press signal equal to the repeat rate.

7. The speed adjustable USB keyboard as claimed in claim 1, the control module further receiving the polling signals from the computer and issuing the simulated press and release signal to the computer.

* * * * *